March 11, 1941.  E. BECKER  2,234,225
APPARATUS FOR STRETCHING OPERATIONS
Filed May 22, 1937

Emil Becker
Inventor:

Patented Mar. 11, 1941

2,234,225

UNITED STATES PATENT OFFICE 2,234,225

APPARATUS FOR STRETCHING OPERATIONS

Emil Becker, Munich, Germany

Application May 22, 1937, Serial No. 144,206
In Germany November 26, 1935

1 Claim. (Cl. 113—44)

This invention relates to an apparatus for stretching operations.

For the shaping of sheet-metal or other thin walled materials, in so far as it is a matter of producing curved surfaces incapable of being developed, the usual kinds of processes are driving by single hammer blows and swaging between swages surrounding the whole blank or piece to be worked. In the former case a very great expenditure of time is necessary, in the latter a great expenditure in costs, so that a substantial economy is attainable, if at all, only in the latter case and even then only for mass production.

In swaging tools it is known to employ as patrix or plunger a part formed of rubber or similar material in order to effect an especially clear filling of the swage by the forging in of this material, whilst sparingly treating the upper surface of the blank by the plunger which is quite free from sharp edges.

The invention consists in employing for sphere-like shaping of thin materials the stretching operation of a soft plunger on the upper surface of the blank or piece to be worked lying over a recess in a matrix, in which the dimensions and depth of the swaging at every working step are kept so small that there is a gradual transition between the as yet unswaged part of the upper surface of the blank or piece to be worked and the swaged part of the surface, the processes of work being carried out in rapid sequence for the ensuring of a small expenditure of work. This process results in a quite exceptionally high expedition and improvement of the work of stretching and hammering because in it each part-stretching of the material is most accurately measurable, that is, the work proceeds very rapidly, whilst at the same time owing to the flexibility of the rubber plunger a very even and neat transition between the stretched parts is obtained and therefore the work is especially uniform. In contra-distinction to the swaging in swages having the dimensions of the whole blank or piece to be worked, the present process results in greatly reduced installation-costs and for exceptionally large blanks production is for the first time really rendered possible at all by this process, and the same is true for blanks of thin and hard sheet-metal, for which the usual swaging operation is unsuitable.

Another valuable feature for the new process is adjustability of the depth of entry of the rubber plunger into the lower swage. This can be effected either by regulation of the stroke of the plunger, especially if the lower swage, constructed as a mould for the whole blank, has at each point the final depth corresponding to the body to be produced. On the other hand in employing a lower swage engaging only a small part of the blank or piece to be worked similar to the plunger, this swage can be made to be variable in depth, such as by a vertically adjustable base. In either case individual parts can be stretched to different degrees while the work progresses rapidly according to the requirements of each particular case.

An especially valuable field of application of the new process is furthermore the tensioning or straightening of sheet-metal. Whilst for thick and soft metal sheets the usual roll straightening machines work satisfactorily, these cannot function with thin and hard sheet-metal because they are not adapted to bend sharply as is required for this purpose; this straightening work must therefore be performed manually by hammering at very great expenditure of time and skill. The new process however, as a result of the accuracy with which the degree of stretching can be confined renders possible a very rapid and accurate straightening of metal sheets by stretching those parts of the surface which, generally, can be easily detected as requiring expansion.

The apparatus for carrying out the new process contains a series of valuable details which will be more fully described hereinafter.

The drawing illustrates the invention as applied to several stretching tools shown diagrammatically in longitudinal section wherein.

Figures 1, 2:
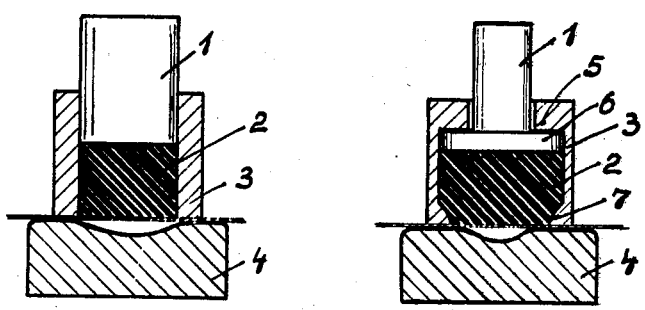
Fig. 1 is a stretching tool with a simple rubber plunger with a ring-support against crumpling.
Fig. 2 is a stretching tool for effecting large deformations with a strongly loaded ring-support against crumpling.

According to Fig. 1 a plunger-like die 1 is provided at the base with a rubber block 2 preferably vulcanised thereto. This together with the lower portion of the plunger are surrounded by a ring-support 3 to prevent crumpling. A lower swage 4 is provided with a recess with a well rounded-off upper edge, to serve as a part swage for shaping different parts of the blank.

The operation is as follows: A blank placed upon the lower swage 4, on depression of the plunger 1, which can be effected by a pressing or hammering machine with an accurate plunger guide, is in the first place embraced by the ring 3 and held down tightly, this ring being carried against the blank by friction with the rubber block 2 simultaneously placed under pressure, the rubber block being of sufficient height. On continuing the stroke, the originally flat under-surface of the rubber block 2 bulges into the recess while pressing the blank and stamps this more or less deeply into the lower swage according to the stroke applied. Thus is formed a flat, concave bulge rounded at its edges where it gradually merges into the surface of the sheet, further bulges being thereupon formed adjacently in similar manner until the desired curved body is produced.

For straightening metal sheets the stroke of the plunger is made so slight, that the curvature of the sheet obtained resiliently returns to the flat. In this case the lower swage may be formed shallow with exactly dimensioned depth.

According to Fig. 2 the apparatus is basically the same as in the previous case, only in the first place the recess in the swage has a considerably smaller diameter than the plunger, in order to form relatively steep curved shapes and vigorous stretching. In this case the surface of the rubber plunger extending beyond the recess in the swage acts to prevent crumpling, so that the sharply curved zone is not bent back again by applying the metal ring 3, and to produce a gentle gradual transition even with deep impressions. The ring 3 is provided at the top with an inwardly directed flange 5, which engages the top of a flange 6 on the plunger, in order to prevent the ring being slid off. At the bottom the ring has an inward projection 7 against which bears the rubber block 2 which has been inserted by being compressed, in order to exert a strong downward retaining pressure directly at the start, independently of the friction of the rubber on the ring.

Figure 3:
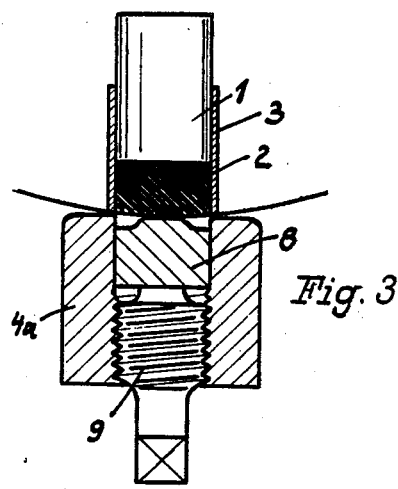
Fig. 3 is a stretching ring with the lower swage vertically adjustable.

According to Fig. 3, the parts 1, 2, 3, thereof correspond to those in Fig. 1. The lower swage 4a is however provided in addition with a vertically adjustable base 8 which is mounted on an adjusting spindle 9. The adjusting spindle can for example be operated by a foot lever, so that while feeding the sheet by hand a regulation of the stretching intensity is effected by the foot at the same time.

Alternatively, the vertical adjustment of the lower swage or the adjustment of stroke of the plunger may be made dependent on the movement of a contact lever device (for example with a pantograph action) which is guided over a pattern. If the blank is moved in the same direction as the contact lever device the swaging operation will produce an article which is a true copy of the pattern in like manner as is known in milling.

The lower swage according to Fig. 3 can be employed for especially deep as also for shallow impressions if it co-acts with a plunger of considerably larger diameter as in Fig. 2.

The plunger and the lower swage may have various sections or plans. The plunger generally has a round cross section. The lower swage in so far as it is intended for single-point swaging has a circular plan for all uniform swaging work. For producing stretching of dimensions differing longitudinally and transversely an elliptical shaped lower swage may be employed with especial advantage, which will result in the amount of stretching dependent on the plunger stroke being greater per unit of length along the shorter axis relatively to that along the longer axis of the ellipse.

I claim:

A device for deforming ductile sheet material to the desired shape by successively producing in a blank small indentations of substantially uniform area and outline adjacent one another, said device comprising a movable rubber die, an element preventing said die from crumpling, and a stationary matrix having a recess of definite outline and being arranged for cooperation with said die, said matrix having a displaceable part forming the bottom of said recess and means to adjust said displaceable part substantially in the direction of movement of said rubber die.

EMIL BECKER.